United States Patent
Patil et al.

(10) Patent No.: US 11,706,821 B2
(45) Date of Patent: Jul. 18, 2023

(54) SYSTEMS AND METHODS FOR FACILITATING CONNECTION TO A DATA NETWORK IN AN INTERWORKING CORE NETWORK

(71) Applicant: Verizon Patent and Licensing Inc., Basking Ridge, NJ (US)

(72) Inventors: Sudhakar Reddy Patil, Flower Mound, TX (US); Maqbool Chauhan, Keller, TX (US); Jerry Steben, Fort Worth, TX (US); Ye Huang, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 260 days.

(21) Appl. No.: 17/175,299

(22) Filed: Feb. 12, 2021

(65) Prior Publication Data

US 2022/0264664 A1    Aug. 18, 2022

(51) Int. Cl.
*H04W 76/10* (2018.01)
*H04W 4/029* (2018.01)
*H04W 92/02* (2009.01)

(52) U.S. Cl.
CPC .......... *H04W 76/10* (2018.02); *H04W 4/029* (2018.02); *H04W 92/02* (2013.01)

(58) Field of Classification Search
CPC ..... H04W 4/029; H04W 76/10; H04W 76/12; H04W 88/16; H04W 92/02; H04W 92/24
USPC .... 455/406, 452.1, 411, 436, 423, 466, 450; 370/235, 253, 352, 328, 237, 351.3, 401, 370/392, 428
See application file for complete search history.

(56) References Cited

U.S. PATENT DOCUMENTS

| | | | | |
|---|---|---|---|---|
| 7,496,068 | B2 * | 2/2009 | Chen | H04L 69/167 |
| | | | | 455/432.1 |
| 11,290,928 | B1 * | 3/2022 | Vivanco | H04W 36/30 |
| 2019/0159282 | A1 * | 5/2019 | Zhu | H04W 48/02 |
| 2019/0199802 | A1 * | 6/2019 | Zhu | H04L 9/40 |
| 2020/0252781 | A1 * | 8/2020 | Edge | H04W 40/20 |
| 2020/0323029 | A1 * | 10/2020 | Lu | H04W 76/11 |
| 2020/0337014 | A1 * | 10/2020 | Liu | H04W 36/32 |
| 2020/0359440 | A1 * | 11/2020 | Qiao | H04W 40/246 |
| 2021/0014739 | A1 * | 1/2021 | Xin | H04L 47/2483 |
| 2021/0144663 | A1 * | 5/2021 | Liu | H04L 43/106 |
| 2021/0282072 | A1 * | 9/2021 | Xin | H04W 28/18 |
| 2022/0141905 | A1 * | 5/2022 | Gan | H04W 36/14 |
| | | | | 370/328 |
| 2022/0210702 | A1 * | 6/2022 | Chen | H04W 36/0022 |
| 2022/0272584 | A1 * | 8/2022 | Zong | H04W 36/0044 |

(Continued)

*Primary Examiner* — Joseph Arevalo

(57) ABSTRACT

In some implementations, a first network device may be associated with a serving gateway control plane function of a core network. The first network device may send, via a first interface, an association message to a second network device that is associated with a session management function and a packet data gateway control plane function of the core network. The first network device may receive selection information from the second network device via the first interface. The first network device may select, based on the selection information, a third network device that is associated with a serving gateway user plane function of the core network. The first network device may cause the third network device to route traffic for a packet data network session associated with a user device.

20 Claims, 12 Drawing Sheets

(56) References Cited

U.S. PATENT DOCUMENTS

2022/0272607 A1\* 8/2022 Yu .................. H04W 8/186
2022/0295355 A1\* 9/2022 Xin ............... H04W 36/0022

\* cited by examiner

SYSTEMS AND METHODS FOR FACILITATING CONNECTION TO A DATA NETWORK IN AN INTERWORKING CORE NETWORK

BACKGROUND

Multi-access edge computing (MEC) is a network architecture of MEC nodes (e.g., devices, virtual machines, and/or the like) that may operate at an edge of a network. The MEC nodes may perform operations of a cellular network for connected user devices that are within a coverage area of the MEC resources.

DETAILED DESCRIPTION OF PREFERRED EMBODIMENTS

Figure 1A:
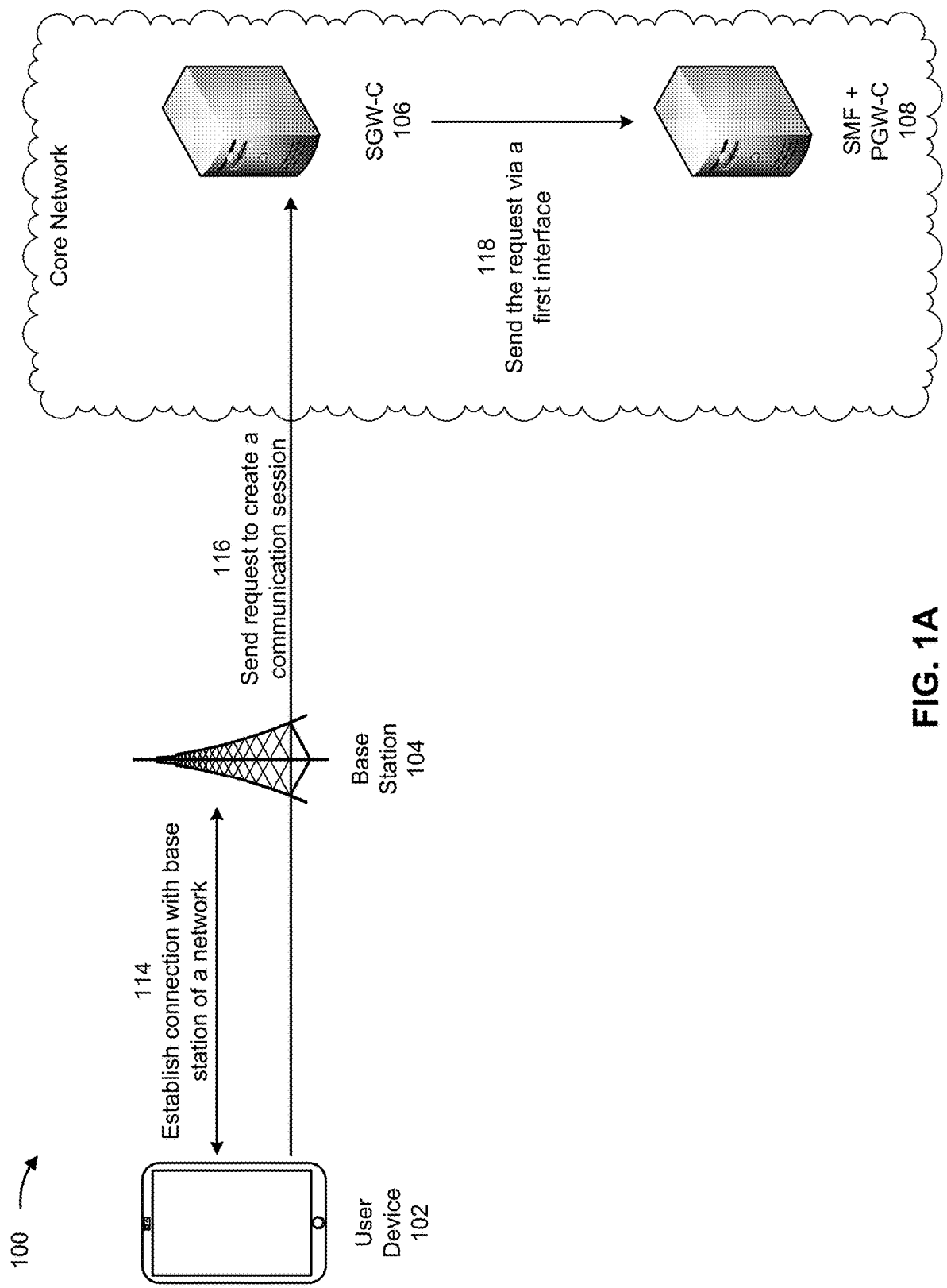
FIGS. 1A-1F are diagrams of an example associated with facilitating connection to a data network in an interworking core network.

The following detailed description of example implementations refers to the accompanying drawings. The same reference numbers in different drawings may identify the same or similar elements.

In some instances, an interworking core network comprises devices associated with core networks of multiple cellular networks, such as an evolved packet core (EPC) network of a long-term evolution (LTE) network and a 5G core network of a 5G network. In this way, the interworking core network can support user devices associated with different cellular networks or user devices that utilize multiple different cellular networks (e.g., because of differences in coverage availability of the cellular networks). However, some services that are supported by a 5G network are not fully supported by an LTE network, such as services provided via MEC. Consequently, a user device that accesses the interworking core network is able to connect to a data network associated with a MEC platform when connected to the interworking core network via a 5G network connection, but may not able to connect to a data network associated with a MEC platform when connected to the interworking core network via an LTE network connection. Thus, in some cases, a communication session may be established between the user device and a data network such that the communication session may not satisfy one or more performance requirements (e.g., a bandwidth requirement, a latency requirement, a reliability requirement, and/or the like).

According to some implementations described herein, a user device may send a request to create a communication session to an interworking core network via an LTE network connection. A first network device (e.g., that is associated with a serving gateway control plane function (SGW-C)) of the interworking core network may send, via a first interface (e.g., an N16a interface, an enhanced S5-C interface, or a hypertext transfer protocol secure (HTTPS) interface, among other examples), an association message to a second network device (e.g., that is associated with a session management function and a packet data gateway control plane function (SMF+PGW-C)) of the interworking core network. The first network device may receive selection information from the second network device via the first interface and may select, based on the selection information, a third network device (e.g., that is associated with a serving gateway user plane function (SGW-U)) of the core network. The first network device may cause the third network device to route traffic for the communication session between the user device and a data network (e.g., that hosts a MEC platform and/or that provides MEC services).

In this way, some implementations described herein facilitate connection to a data network in an interworking core network. Accordingly, some implementations allow a user device that connects to the interworking core network via an LTE network connection to connect to a data network associated with a MEC platform. Some implementations therefore increase a likelihood of establishment of a communication session between the user device and a data network such that the communication session satisfies one or more performance requirements (e.g., a bandwidth requirement, a latency requirement, a reliability requirement, and/or the like). This may reduce an amount of computing resources and/or network resources that may otherwise have been used to establish and provide a suboptimal communication session between the user device and a data network not associated with a MEC platform.

FIGS. 1A-1F are diagrams of an example implementation 100 associated with facilitating connection to a data network in an interworking core network. As shown in FIGS. 1A-1F, example implementation 100 may include a user device 102 (e.g., a mobile phone), a base station 104, and one or more devices of a core network (e.g., an interworking core network, such as a core network associated with an evolved packet core (EPC) network and a 5G core network), such as a serving gateway control plane function (SGW-C) 106, a session management function and a packet data gateway control plane function (SMF+PGW-C) 108, one or more serving gateway user plane functions (SGW-Us) 110 (shown in FIG. 1C as SGW-U 110-1 through 110-N, where N≥1), and one or more data networks 112. These devices are described in more detail below in connection with FIG. 3 and FIG. 4.

As shown in FIGS. 1A-1F, the user device 102 may wish to access the core network. For example, as shown in FIG. 1A, and by reference number 114, the user device 102 may establish a connection (e.g., a radio resource control (RRC) connection) with the base station 104. In some implementations, the user device 102 may establish the connection with the base station 104 to transfer data over a non-access stratum (NAS). As further shown in FIG. 1A, and by reference number 116, the user device may send a request to the SGW-C 106 via the base station 104 (e.g., after the user device 102 establishes the connection with the base station 104). The request may include a request to create a communication session for the user device 102. For example, the user device 102 may send, to the SGW-C 106, a request related to creation of a packet data network (PDN) session for the user device 102 (e.g., to allow the user device 102 to communicate with a data network 112, of the one or more data networks 112). In some implementations, the SGW-C 106 may receive the request via a particular interface of the SGW-C 106, such as an S11 interface of the SGW-C 106.

Figure 1B:
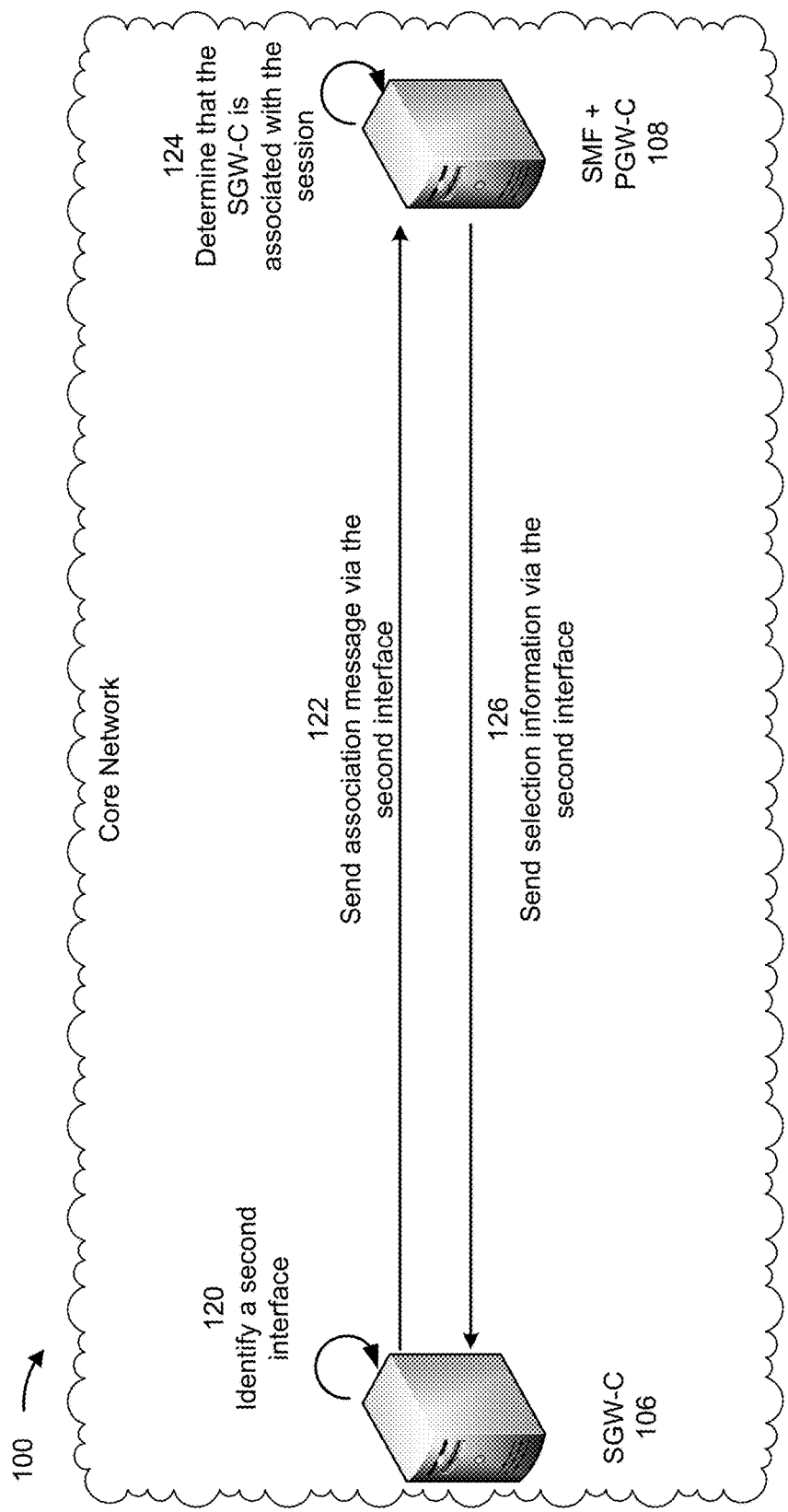
Figure 1C:
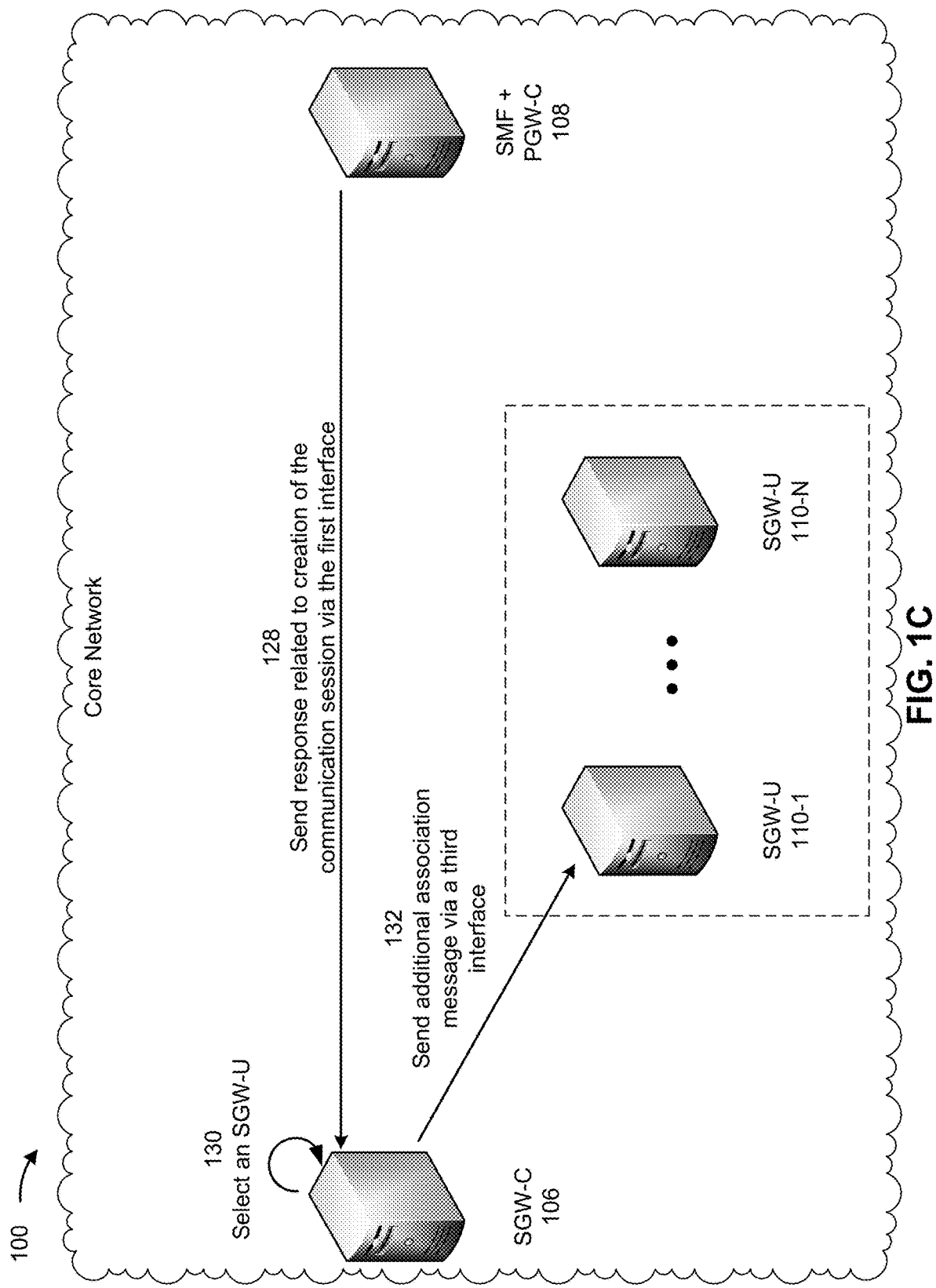
Figure 1D:
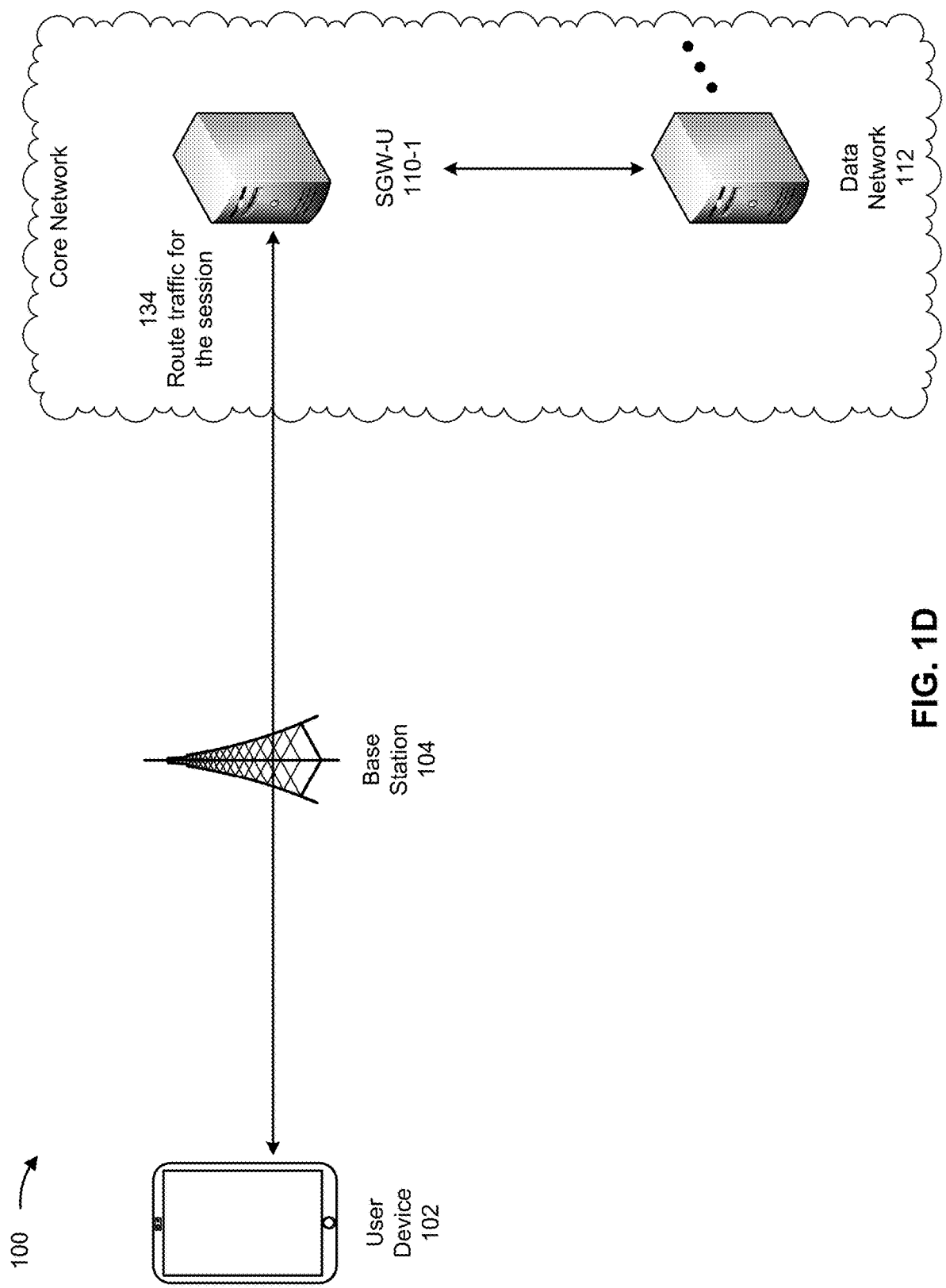
Figure 1E:
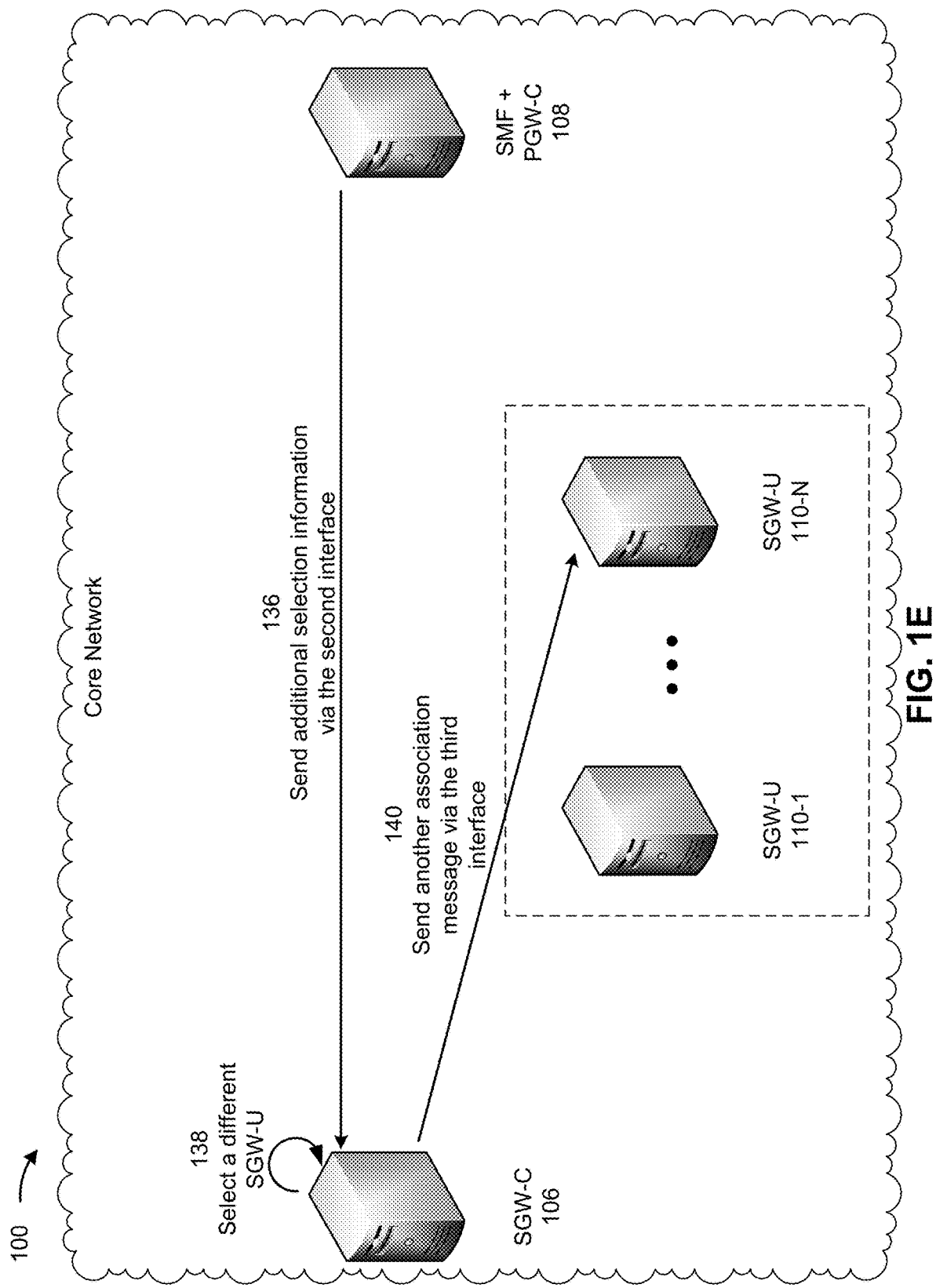
Figure 1F:
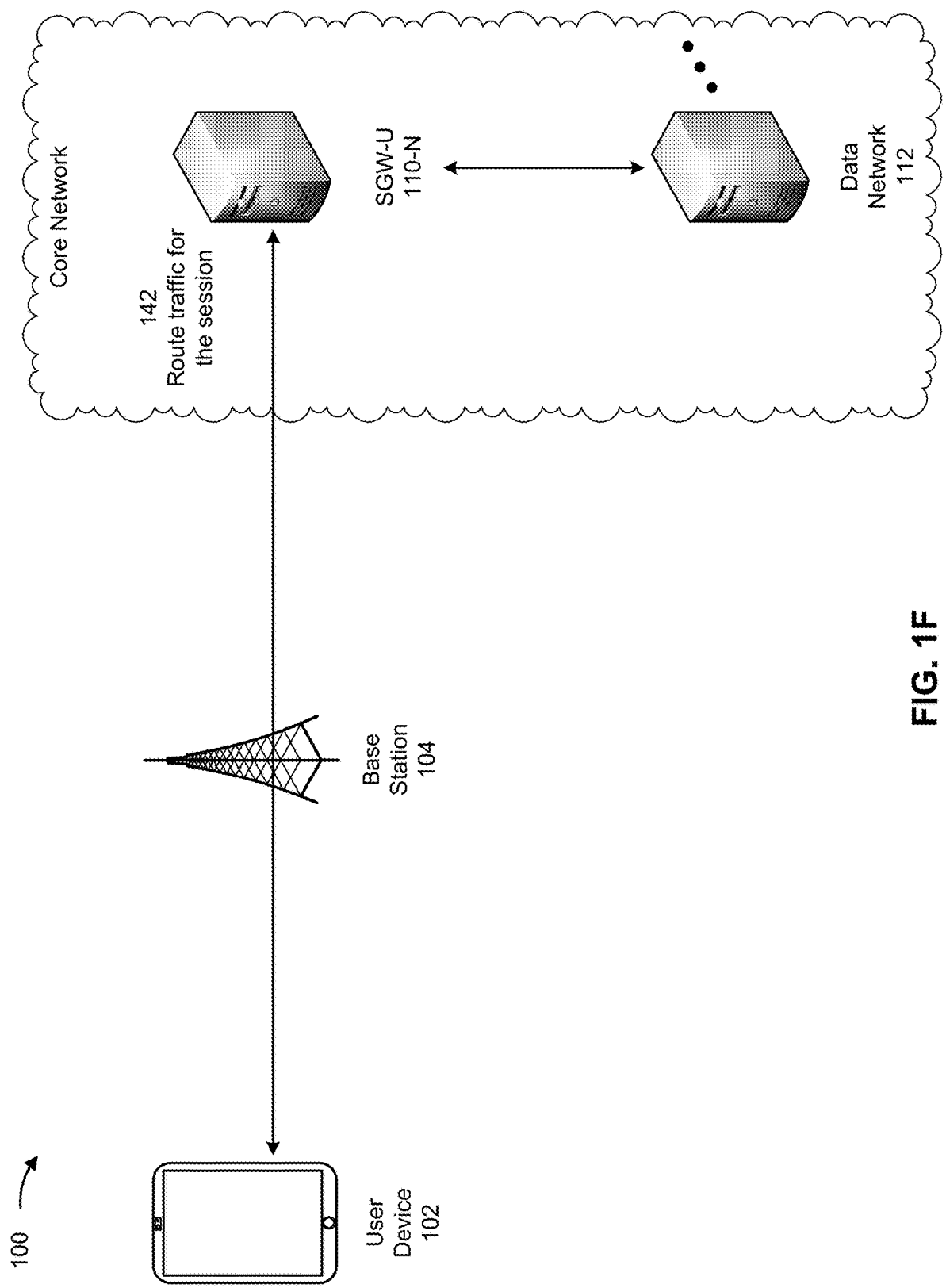
Figure 2A:
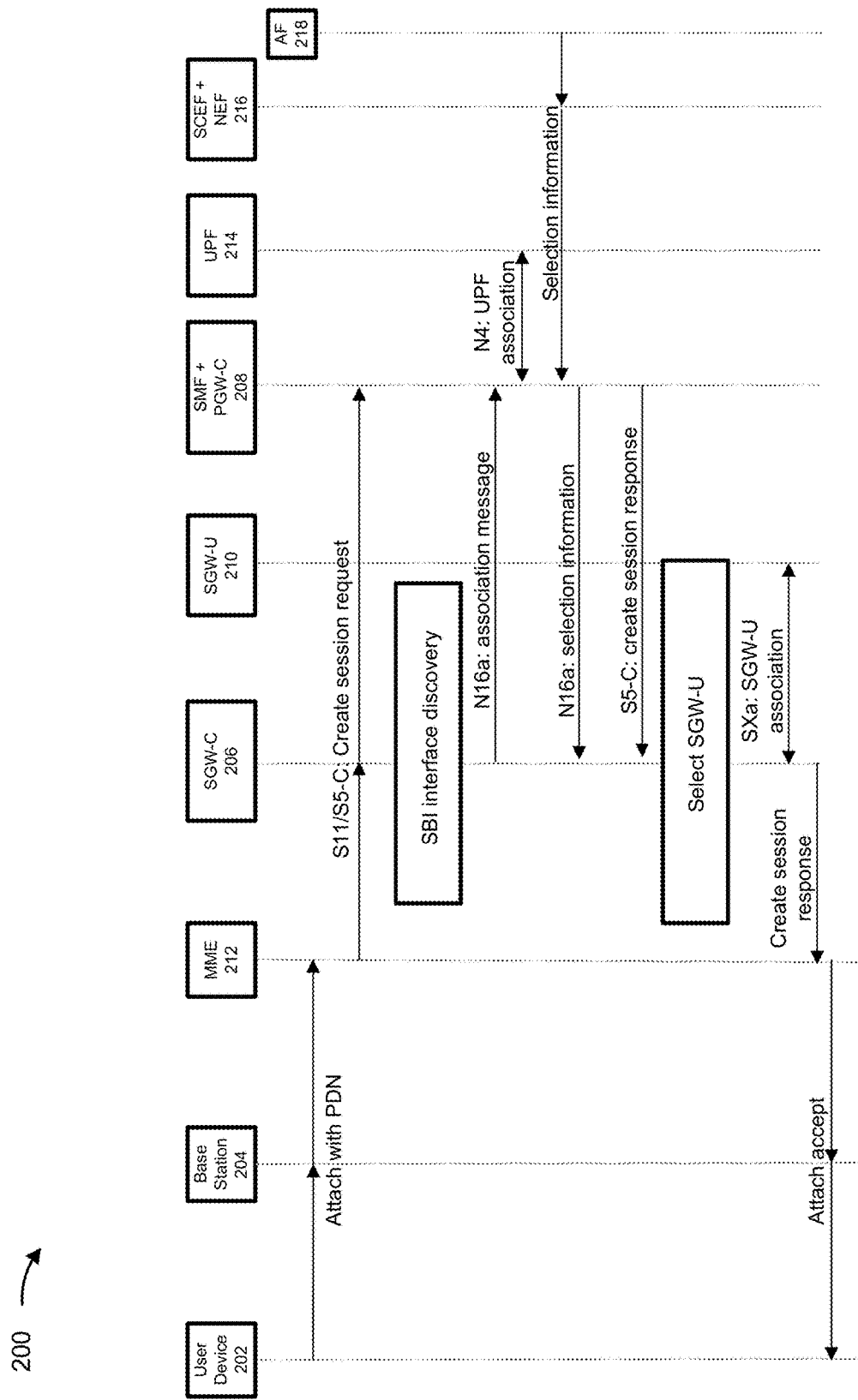
FIGS. 2A-2B are diagrams of example call flows relating to facilitating connection to a data network in an interworking core network.

For example, the SGW-C 106 may receive, via an S11 interface, the request from a mobility management entity (MME) (not shown in FIGS. 1A-1F) of the core network (e.g., as described in further detail in relation to FIG. 2A).

As further shown in FIG. 1A, and by reference number 118, the SGW-C 106 may send the request (e.g., by forwarding, or modifying and then forwarding, the request) to the SMF+PGW-C 108. For example, the SGW-C 106 may send the request to the SMF+PGW-C 108 via a first interface, such as an S5-C interface, between the SGW-C 106 and the SMF+PGW-C 108. In some implementations, the SMF+PGW-C 108 may communicate, based on the request, with one or more other components of the core network, such as a user plane function (UPF), a network exposure function (NEF), a service capability exposure function (SCEF), a policy control function (PCF), an application function (AF), and/or the like (not shown in FIGS. 1A-1F) to cause creation of the session (e.g., as described in further detail in relation to FIG. 2A).

As shown in FIG. 1B, and by reference number 120, the SGW-C 106 may identify a second interface between the SGW-C 106 and the SMF+PGW-C 108. For example, the SGW-C 106 may identify an N16a interface, an enhanced S5-C interface, or an HTTPS interface, among other examples, between the SGW-C 106 and the SMF+PGW-C 108. As further shown in FIG. 1B, and by reference number 122, the SGW-C 106 may send an association message to the SMF+PGW-C 108 via the second interface (e.g., via the N16a interface, the enhanced S5-C interface, or the HTTPS interface, among other examples). The association message may indicate that the SMF+PGW-C 108 is associated with the SGW-C 106 (e.g., that SMF+PGW-C 108 and the SGW-C 106 are connected via an active N16a interface). As further shown in FIG. 1B, and by reference number 124, the SMF+PGW-C 108 may determine that the SGW-C 106 is associated with the session for the user device 102. For example, the SMF+PGW-C 108 may determine that the SGW-C 106 is associated with the session because the SMF+PGW-C 108 received the request to create the session and the association message from the SGW-C 106.

In some implementations, when communicating with the one or more other components of the core network to cause the communication session to be created, the SMF+PGW-C 108 may receive selection information via a different interface of the SMF+PGW-C 108, such as an N7 interface (e.g., that is connected to a PCF, not shown in FIGS. 1A-1F, of the core network). Accordingly, the SMF+PGW-C 108 may then send the selection information to the SGW-C. For example, as further shown in FIG. 1B, and by reference number 126, the SMF+PGW-C 108 may send (e.g., based on determining that the SGW-C 106 is associated with the session) the selection information to the SGW-C 106 via the second interface (e.g., via the N16a interface, the enhanced S5-C interface, or the HTTPS interface, among other examples). The selection information may include identification information associated with the one or more data networks 112. For example, the selection information may include, for a data network 112, a data network access identifier (DNAI), a data network name (DNN), a location (e.g., a physical location), and/or the like associated with the data network 112. Additionally, or alternatively, the selection information may include one or more selection rules associated with the one or more data networks 112. For example, the selection information may include, for a data network 112, a bandwidth requirement, a latency requirement, a reliability requirement, and/or the like that should be satisfied for routing traffic to or from the data network 112.

As shown in FIG. 1C, and by reference number 128, the SMF+PGW-C 108 may send a response related to creation of the communication session to the SGW-C 106 via the first interface (e.g., the S5-C interface). The response may indicate that the communication session (e.g., a PDN session) has been created, that the user device 102 is to communicate with a particular data network 112, of the one or more data networks 112, during the communication session, and/or the like.

As further shown in FIG. 1C, and by reference number 130, the SGW-C 106 may select a particular SGW-U 110, of the one or more SGW-Us 110, to route traffic for the communication session (e.g., to route traffic between the user device 102 and the particular data network 112). For example, as shown in FIG. 1C, the SGW-C 106 may identify the one or more SGW-Us 110 and may select the SGW-U 110-1. In some implementations, the SGW-C 106 may process the selection information to determine the identification information associated with the one or more data networks 112 and/or the one or more selection rules associated with the one or more data networks 112. Additionally, or alternatively, the SGW-C 106 may identify (e.g., based on the response) the particular data network 112 that is to communicate with the user device 102 during the session. Accordingly, the SGW-C 106 may identify a set of selection rules associated with the particular data network 112 and may select a particular SGW-U 110 based on the set of selection rules. For example, when the set of selection rules includes a latency requirement, the SGW-C 106 may select a particular SGW-U 110 that provides a shortest transmission path (e.g., a shortest physical length) between the user device 102 and the particular data network 112. In some implementations, the SGW-C 106 may determine a location of the user device 102 and a location of the particular data network 112 (e.g., based on the request and/or the response, among other examples) and may search (e.g., based on the locations of the user device 102 and the particular data network 112) a data structure that includes locations of the one or more SGW-Us 110 to identify the particular SGW-U 110 that provides the shortest transmission path.

As further shown in FIG. 1C, and by reference number 132, the SGW-C 106 may send an additional association message to the particular SGW-U 110 (e.g., that was selected by the SGW-C 106) via an interface between the SGW-C 106 and the particular SGW-U 110, such as an SXa interface. For example, as shown in FIG. 1C, the SGW-C 106 may send the additional association message to the SGW-U 110-1 (e.g., via the SXa interface). Accordingly, the particular SGW-U 110 may associate with the particular data network 112. For example, the SGW-U 110-1 may establish, based on the additional association message, a connection with the particular data network 112.

As shown in FIG. 1D, and by reference number 134, the particular SGW-U 110 may route traffic for the communication session (e.g., based on the particular SGW-U 110 forming an association with the particular data network 112). For example, as shown in FIG. 1D, the SGW-U 110-1 may route the traffic for the session between the user device 102 and the data network 112.

As shown in FIG. 1E, and by reference number 136, the SMF+PGW-C 108 may send additional selection information to the SGW-C 106 via the second interface. For example, a location of the user device 102 may change, and the user device may send an update to the core network (e.g., via the base station 104) indicating the change in location. Accordingly, the one or more other components of the core network may generate and send (e.g., based on the update)

the additional selection information to the SMF+PGW-C 108 (e.g., via the N4 interface associated with the SMF+PGW-C 108). Accordingly, the SMF+PGW-C 108 may send the additional selection information to the SGW-C 106 (e.g., via the N16a interface, the enhanced S5-C interface, or the HTTPS interface, among other examples). The additional selection information may include identification information associated with the one or more data networks 112 and/or one or more selection rules associated with the one or more data networks 112 (e.g., that are the same or different than the selection rules included in the original selection information sent to the SGW-C 106 by the SMF+PGW-C 108).

As further shown in FIG. 1E, and by reference number 138, the SGW-C 106 may select an alternate SGW-U 110, of the one or more SGW-Us 110, to route traffic for the session (e.g., in a similar manner as that described herein in relation to FIG. 1C and reference number 130). For example, the SGW-C 106 may select the SGW-U 110-N to route traffic between the user device 102 and the particular data network 112. As further shown in FIG. 1E, and by reference number 140, the SGW-C 106 may send another association message to the alternate SGW-U 110 (e.g., that was selected by the SGW-C 106) via an interface between the SGW-C 106 and the alternate SGW-U 110 to cause the alternate SGW-U 110 to associate with the particular data network 112 (e.g., in a similar manner as that described herein in relation to FIG. 1C and reference number 132). For example, as shown in FIG. 1C, the SGW-C 106 may send the additional association message to the SGW-U 110-N (e.g., via an SXa interface) to cause the SGW-U 110-N to establish a connection with the particular data network 112. This may cause the particular SGW-U 110 to disassociate with the particular data network 112, which may cause the particular SGW-U 110 to cease routing traffic for the communication session. For example, this may cause the SGW-U 110-1 to disconnect from the particular data network 112, which may prevent the SGW-U 110-1 from routing traffic for the communication session.

As shown in FIG. 1F, and by reference number 142, the alternate SGW-U 110 may route traffic for the communication session (e.g., based on the alternate SGW-U 110 forming an association with the particular data network 112). For example, as shown in FIG. 1D, the SGW-U 110-N may route the traffic for the communication session between the user device 102 and the particular data network 112.

In this way, some implementations described herein facilitate connection to a data network in an interworking core network. Accordingly, some implementations allow a user device that connects to the interworking core network via an LTE network connection to connect to a data network associated with a MEC platform. Some implementations therefore increase a likelihood of establishment of a communication session between the user device and a data network such that the communication session satisfies one or more performance requirements (e.g., a bandwidth requirement, a latency requirement, a reliability requirement, and/or the like). This may reduce an amount of computing resources and/or network resources that may otherwise have been used to establish and provide a suboptimal communication session between the user device and a data network not associated with a MEC platform.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2B:
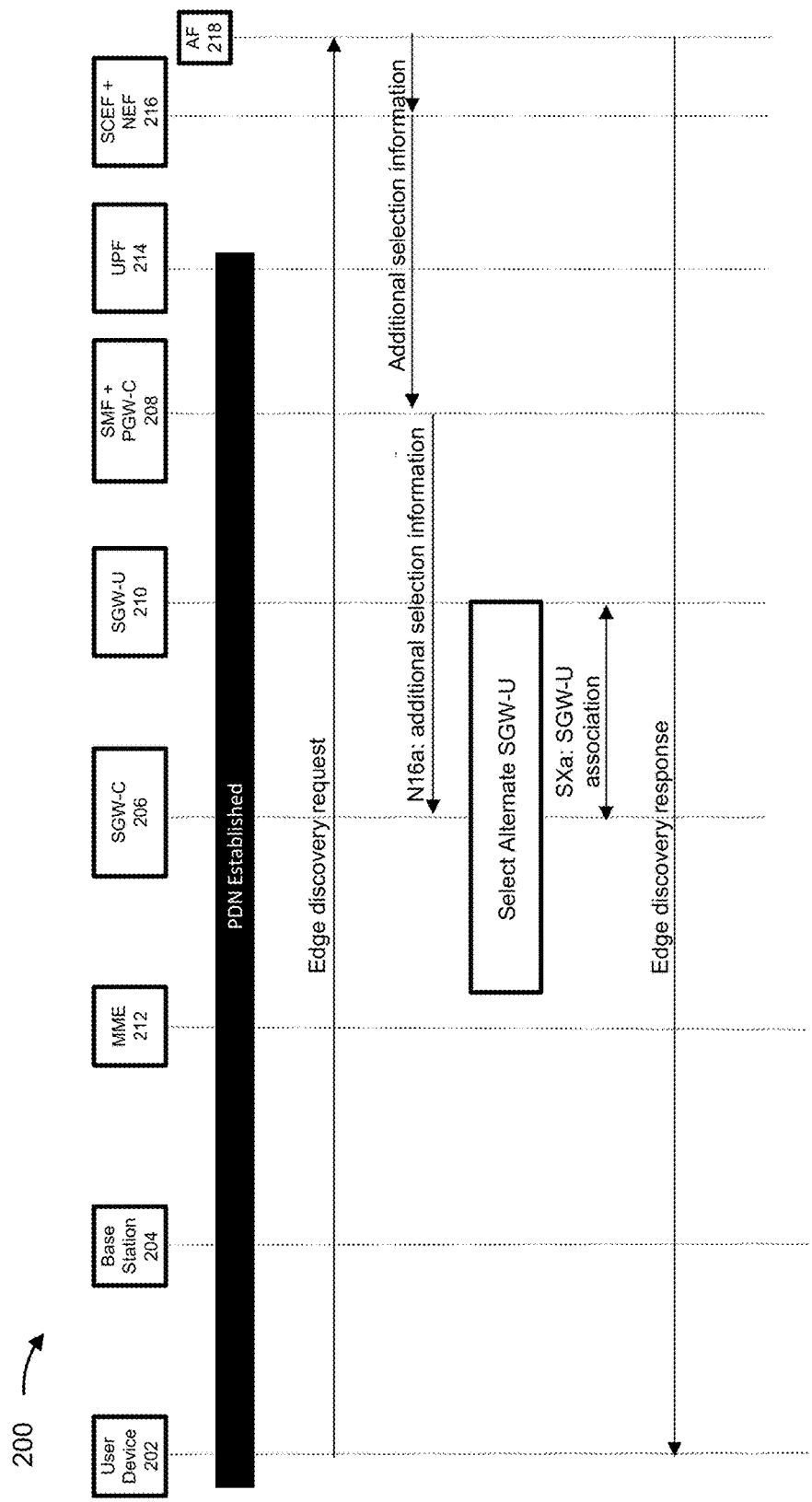

FIGS. 2A-2B are diagrams of example call flows 200 relating to facilitating connection to a data network in an interworking core network. The call flows include a process performed by a user device 202, a base station 204, and one or more networks of a core network, such as an SGW-C 206, an SMF+PGW-C 208, an SGW-U 210, an MME 212, a UPF 214, a SCEF+NEF 216, and an AF 218.

As shown in FIG. 2A, the user device 202 may send an attach request (e.g., a request related to creation of a PDN session for the user device 202) to the MME 212 via the base station 204 (e.g., in similar manner as that described herein in relation to FIG. 1A and reference numbers 114 and 116). As further shown in FIG. 2A, the MME 212 may send (e.g., via an S11 interface) a create session request to the SGW-C 206, which may send (e.g., via an S5-C interface) the create session request to the SMF+PGW-C 208 (e.g., in similar manner as that described herein in relation to FIG. 1A and reference number 118).

As further shown in FIG. 2A, the SGW-C 206 may perform a service based interface (SBI) discovery process to identify an additional interface between the SGW-C 206 and the SMF+PGW-C 208 (e.g., in similar manner as that described herein in relation to FIG. 1B and reference number 120). For example, the SGW-C 206 may identify an N16a interface, an enhanced S5-C interface, or an HTTPS interface, among other examples, between the SGW-C 206 and the SMF+PGW-C 208. As further shown in FIG. 2A, the SGW-C 206 may send (e.g., via the N16a interface, the enhanced S5-C interface, or the HTTPS interface, among other examples) an association message to the SMF+PGW-C 208 via the second interface (e.g., in similar manner as that described herein in relation to FIG. 1B and reference number 122). As further shown in FIG. 2A, the SMF+PGW-C 208 may communicate (e.g., via an N4 interface) with the UPF 214 to establish an association with the UPF 214. As further shown in FIG. 2A, the AF 218 may send selection information to the SCEF+NEF 216, which may send (e.g., via an N7 interface) the selection information to the SMF+PGW-C 208, which may send (e.g., via the N16a interface, the enhanced S5-C interface, or the HTTPS interface, among other examples) the selection information to the SGW-C 206 (e.g., in similar manner as that described herein in relation to FIG. 1B and reference number 126).

As further shown in FIG. 2A, the SMF+PGW-C 208 may send (e.g., via the S5-C interface) a response related to creation of the communication session to the SGW-C 206 (e.g., in similar manner as that described herein in relation to FIG. 1C and reference number 128). As further shown in FIG. 2A, the SGW-C 206 may select (e.g., based on the selection information) an SGW-U 210 to route traffic for the communication session (e.g., in similar manner as that described herein in relation to FIG. 1C and reference number 130). As further shown in FIG. 2A, the SGW-C 206 may communicate (e.g., via an SXa interface) with the SGW-U 210 to cause the SGW-U 210 to associate with the communication session (e.g., in similar manner as that described herein in relation to FIG. 1C and reference number 132). As further shown in FIG. 2A, the SGW-C 206 may send the create session response to the MME 212, which may send an attach accept message to the user device 202 via the base station 204.

As shown in FIG. 2B, a communication session (e.g., a PDN session) may be established for the user device 202. As further shown in FIG. 2B, the user device 202 may send an edge discovery request (e.g., that includes an update regarding a change in location of the user device 202) to the AF 218 (e.g., in similar manner as that described herein in relation to FIG. 1E and reference number 136). As further shown in FIG. 2B, the AF 218 may send additional selection information to the SCEF+NEF 216, which may send (e.g., via the N7 interface) the additional selection information to the SMF+PGW-C 208, which may send (e.g., via the N16a interface, the enhanced S5-C interface, or the HTTPS interface, among other examples) the additional selection information to the SGW-C 206 (e.g., in similar manner as that described herein in relation to FIG. 1E and reference number 136).

As further shown in FIG. 2B, the SGW-C 206 may select (e.g., based on the additional selection information) an alternate SGW-U 210 to route traffic for the communication session (e.g., in similar manner as that described herein in relation to FIG. 1E and reference number 138). As further shown in FIG. 2B, the SGW-C 206 may communicate (e.g., via an SXa interface) with the alternate SGW-U 210 to cause the alternate SGW-U 210 to associate with the communication session (e.g., in similar manner as that described herein in relation to FIG. 1E and reference number 140). As further shown in FIG. 2B, the AF 218 may send an edge discovery response (e.g., indicating receipt of the edge discovery request) to the user device 202.

As indicated above, FIGS. 2A-2B are provided as an example. Other examples may differ from what is described with regard to FIGS. 2A-2B. The number and arrangement of devices shown in FIGS. 2A-2B are provided as an example. In practice, there may be additional devices, fewer devices, different devices, or differently arranged devices than those shown in FIGS. 2A-2B. Furthermore, two or more devices shown in FIGS. 2A-2B may be implemented within a single device, or a single device shown in FIGS. 2A-2B may be implemented as multiple, distributed devices. Additionally, or alternatively, a set of devices (e.g., one or more devices) shown in FIGS. 2A-2B may perform one or more functions described as being performed by another set of devices shown in FIGS. 2A-2B.

Figure 3:
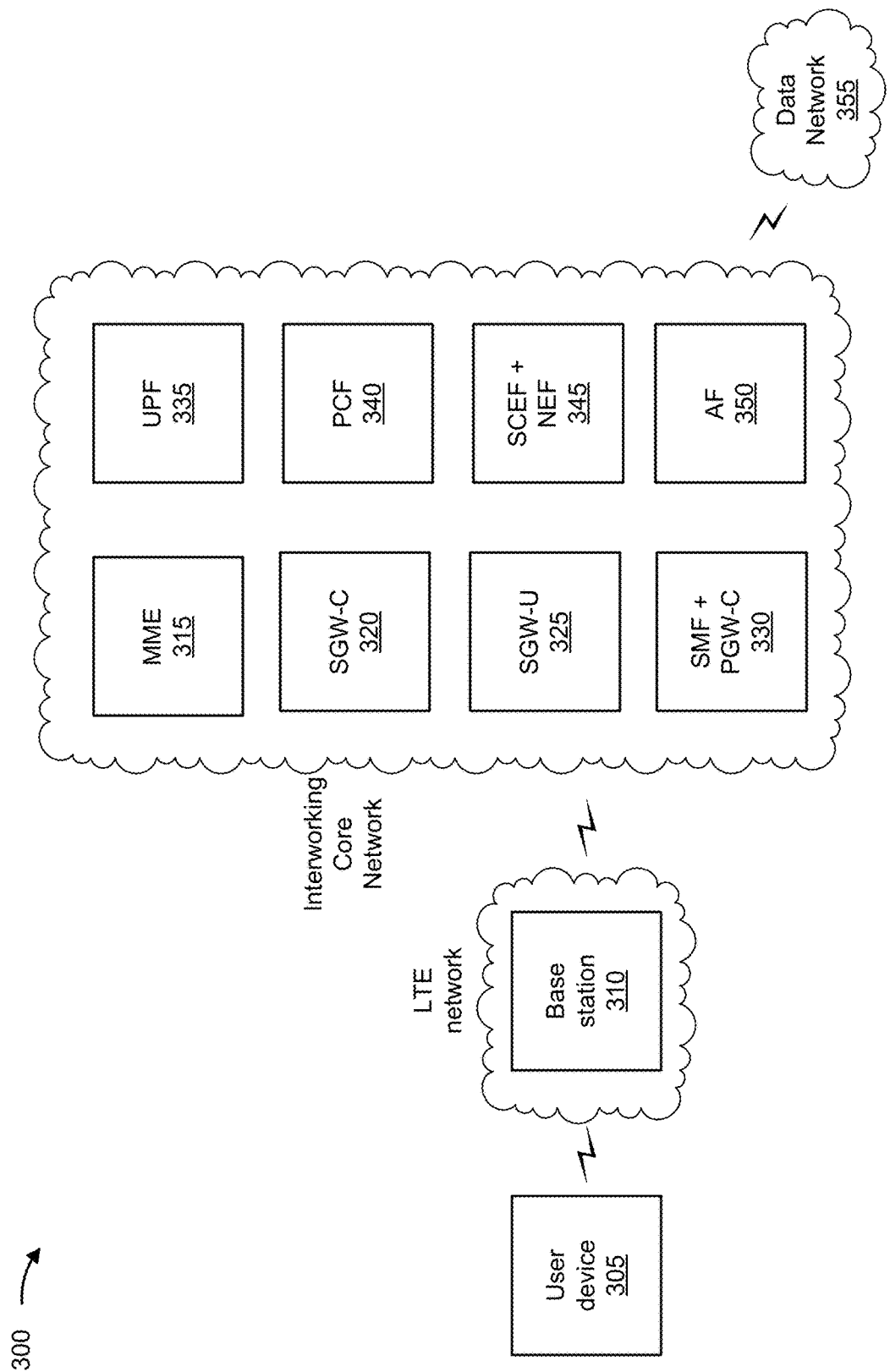
FIG. 3 is a diagram of an example environment in which systems and/or methods described herein may be implemented.

FIG. 3 is a diagram of an example environment 300 in which systems and/or methods, described herein, may be implemented. As shown in FIG. 3, environment 300 may include a user device 305, a base station 310, an MME 315, an SGW-C 320, an SGW-U 325, an SMF+PGW-C 330, a UPF 335, a PCF 340, a SCEF+NEF 345, an AF 350, and a data network 355. Devices of environment 300 may interconnect via wired connections, wireless connections, or a combination of wired and wireless connections.

Some implementations are described herein as being performed within a long-term evolution (LTE) network for explanatory purposes. Some implementations may be performed within a network that is not an LTE network, such as a third generation (3G) network, a fifth generation (5G) network, and/or the like.

Environment 300 may include an interworking core network (e.g., that includes an EPC network and/or 5G core network) that operates based on a third-generation partnership project (3GPP) wireless communication standard. The LTE network may include a radio access network (RAN) that includes one or more base stations 310 that take the form of evolved Node Bs (eNBs) via which user device 305 communicates with the interworking core network. The interworking core network may include MME 315, SGW-C 320, SGW-U 325, SMF+PGW-C 330, UPF 335, PCF 340, SCEF+NEF 345, and/or AF 350 to enable user device 305 to communicate with data network 355.

User device 305 includes one or more devices capable of communicating with other user devices 305, base station 310, and/or a network (e.g., data network 355). For example, user device 305 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, and/or the like), or a similar type of device. User device 305 may send traffic to and/or receive traffic from data network 355 (e.g., via base station 310 and SGW-U 325).

Base station 310 includes one or more devices capable of transferring traffic, such as audio, video, text, and/or other traffic, destined for and/or received from user device 305. In some implementations, base station 310 may include an eNB associated with the LTE network that receives traffic from and/or sends traffic to data network 355 via SGW-U 325. Additionally, or alternatively, one or more base stations 310 may be associated with a RAN that is not associated with the LTE network. Base station 310 may send traffic to and/or receive traffic from user device 305 via an air interface. In some implementations, base station 310 may include a small cell base station, such as a base station of a microcell, a picocell, a femtocell, and/or the like.

MME 315 includes one or more devices, such as one or more server devices, capable of managing authentication, activation, deactivation, and/or mobility functions associated with user device 305. In some implementations, MME 315 may perform operations relating to authentication of user device 305. Additionally, or alternatively, MME 315 may facilitate the selection of a particular SGW-C 320 to control routing of traffic to and/or from user device 305. MME 315 may be connected to SGW-C 320 via an S11 interface.

SGW-C 320 includes one or more devices, such as one or more server devices, capable of controlling the routing of packets. In some implementations, SGW-C 320 may facilitate creation of a session to allow communication of traffic between user device 305 and data network 355. In some implementations, SGW-C 320 may be connected to SMF+PGW-C 330 via an S5-C interface and an N16a interface. SGW-C 320 may communicate with SMF+PGW-C 330 to select an SGW-U 325 to route traffic associated with the session between user device 305 and data network 355.

SGW-U 325 includes one or more devices capable of routing packets. For example, SGW-U 325 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW-U 325 may be connected to SGW-C 320 via an SXa interface. In some implementations, SGW-U 325 may route traffic associated with the session between user device 305 and data network 355.

SMF+PGW-C 330 includes one or more devices that support the establishment, modification, and release of a communication session between user device 305 and data network 355. For example, SMF+PGW-C 330 may communicate with SGW-C 320 to cause SGW-C 320 to select SGW-U 325 to route traffic associated with the session between user device 305 and data network 355.

UPF 335 includes one or more devices that serve as an anchor point for intraRAT and/or interRAT mobility. In some implementations, UPF 335 may be connected to SMF+PGW-C 330 via an N4 interface and may be connected to SGW-C 106 via an S5-U interface.

PCF 340 includes one or more devices that provide a policy framework that incorporates network slicing, roaming, packet processing, mobility management, and/or the like. PCF 340 may communicate with SMF+PGW-C 330 to provide information that may facilitate selection of SGW-U 325 to route traffic associated with the session between user device 305 and data network 355. In some implementations, PCF 340 may be connected to SMF+PGW-C 330 UPF 335 via an N7 interface.

SCEF+NEF 345 includes one or more devices that support exposure of capabilities and/or events in the environment 300 to help other entities in the environment 300 discover network services. SCEF+NEF 345 may communicate with PCF 340 to provide information that may facilitate selection of SGW-U 325 to route traffic associated with the session between user device 305 and data network 355. In some implementations, SCEF+NEF 345 may be connected to PCF 340 via an N30 interface.

AF 350 includes one or more devices that support application influence on traffic routing, policy control, and/or the like. AF 350 may communicate with SCEF+NEF 345 to provide information that may facilitate selection of SGW-U 325 to route traffic associated with the session between user device 305 and data network 355. In some implementations, AF 350 may be connected to SCE+NEF 345 via an N33 interface.

Data network 355 includes one or more wired and/or wireless data networks. For example, data network 355 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks. In some implementations, data network 355 may be associated with a MEC platform.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
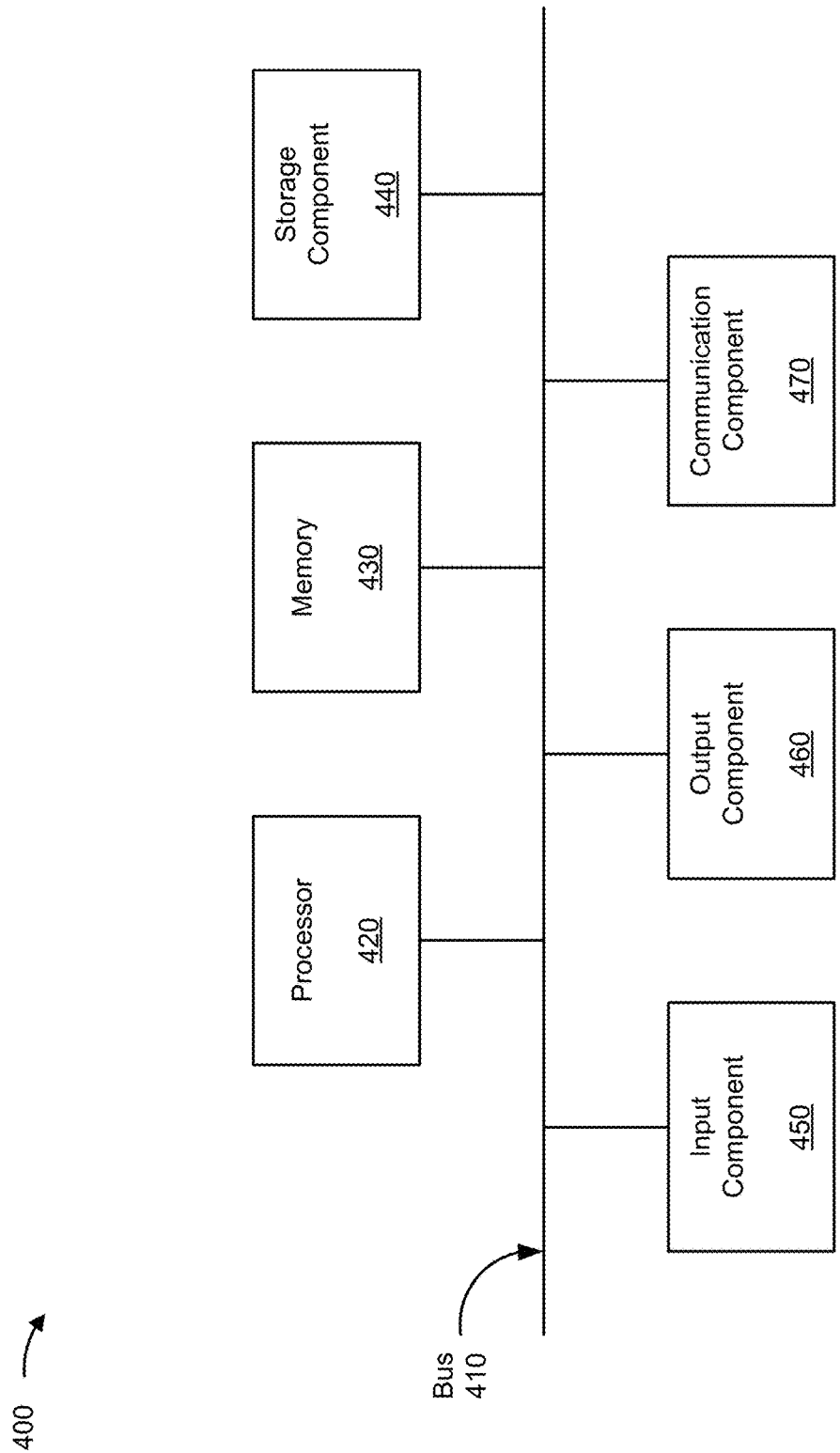
FIG. 4 is a diagram of example components of one or more devices of FIG. 3.

FIG. 4 is a diagram of example components of a device 400, which may correspond to user device 305, base station 310, MME 315, SGW-C 320, SGW-U 325, SMF+PGW-C 330, UPF 335, PCF 340, SCEF+NEF 345, and/or AF 350. In some implementations, user device 305, base station 310, MME 315, SGW-C 320, SGW-U 325, SMF+PGW-C 330, UPF 335, PCF 340, SCEF+NEF 345, and/or AF 350 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
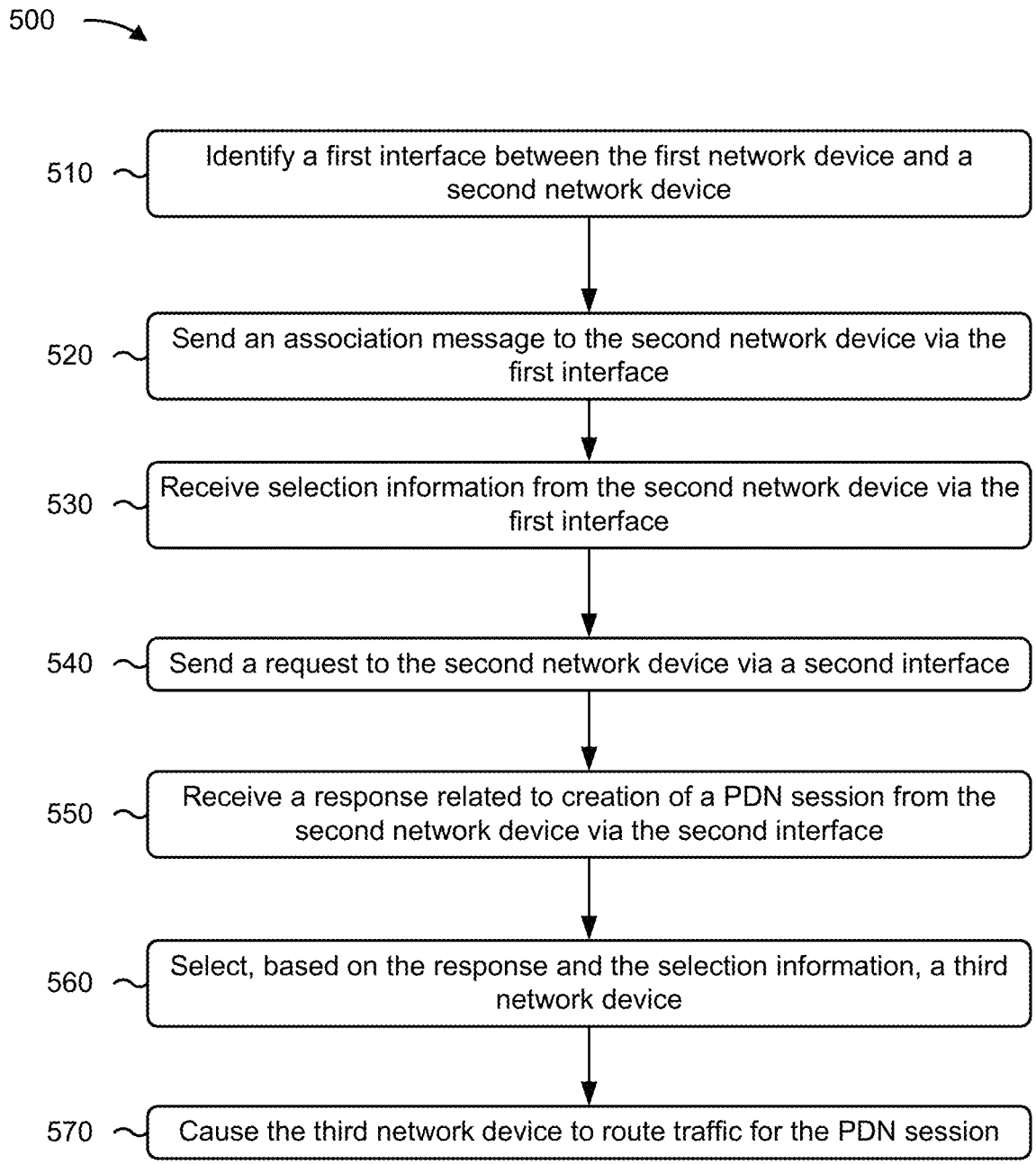
FIGS. 5-6 are flowcharts of example process relating to facilitating connection to a data network in an interworking core network.

FIG. 5 is a flowchart of an example process 500 associated with facilitating connection to a data network in an interworking core network. In some implementations, one or more process blocks of FIG. 5 may be performed by a first network device of a core network, such as a first network device associated with a serving gateway control plane function of a core network (e.g., SGW-C 106, SGW-C 206, SGW-C 320, and/or the like). The core network may be an interworking core network (e.g., that is associated with an EPC network and/or a 5G core network). In some implementations, one or more process blocks of FIG. 5 may be performed by another device or a group of devices separate from or including the first network device, such as any other device described in relation to FIGS. 1A-1F, 2A-2B, and 3. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include identifying a first interface between the first network device and a second network device (block 510). For example, the first network device may identify a first interface between the first network device and a second network device, as described above. The second network device may be associated with a session management function and a packet data gateway control plane function of the core network. In some implementations, the first interface is an N16a interface.

As further shown in FIG. 5, process 500 may include sending an association message to the second network device via the first interface (block 520). For example, the first network device may send an association message to the second network device via the first interface, as described above.

As further shown in FIG. 5, process 500 may include receiving selection information from the second network device via the first interface (block 530). For example, the first network device may receive, after sending the association message, selection information from the second network device via the first interface, as described above. The selection information may include identification information associated with one or more data networks and/or one or more selection rules associated with the one or more data networks.

As further shown in FIG. 5, process 500 may include sending a request to the second network device via a second interface (block 540). For example, the first network device may send a request related to creation of a PDN session for a user device to the second network device via a second interface between the first network device and the second network device, as described above. In some implementations, the second interface is an S5-C interface.

As further shown in FIG. 5, process 500 may include receiving a response related to creation of a PDN session from the second network device via the second interface (block 550). For example, the first network device may receive, after sending the request, a response related to the creation of the PDN session from the second network device via the second interface, as described above.

As further shown in FIG. 5, process 500 may include selecting, based on the response and the selection information, a third network device (block 560). For example, the first network device may select, based on the response and the selection information, a third network device associated with a serving gateway user plane function of the core network, as described above.

In some implementations, selecting the third network device includes determining locations of one or more network devices respectively associated with serving gateway user plane functions of the core network, determining, based on the request, a location of the user device, determining, based on the response, a location of a data network, identifying a particular network device, of the one or more network devices, based on the locations of the one or more network devices, the location of the user device, and the location of the data network, and selecting the particular network device as the third network device. In some implementations, selecting the third network device of the core network to route the traffic for the PDN session comprises identifying one or more network devices respectively associated with serving gateway user plane functions of the core network, determining, based on the selection information, identification information associated with one or more data networks and one or more selection rules associated with the one or more data networks, identifying a particular network device, of the one or more network devices, based on the identification information associated with one or more data networks and the one or more selection rules associated with the one or more data networks, and selecting the particular network device as the third network device.

As further shown in FIG. 5, process 500 may include causing the third network device to route traffic for the PDN session (block 570). For example, the first network device may cause the third network device to route traffic for the PDN session, as described above. In some implementations, causing the third network device to route traffic for the PDN session includes sending an additional association message to the third network device via a third interface between the first network device and the third network device to cause the third network device to be associated with a data network, and the third network device to route the traffic for the PDN session between the user device and the data network. The third interface may be an SXa interface.

In some implementations, process 500 includes receiving, via the first interface, additional selection information from the second network device, selecting, based on the additional selection information, a fourth network device associated with a serving gateway user plane function of the core network to route the traffic for the PDN session, and causing the fourth network device to route the traffic for the PDN session.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
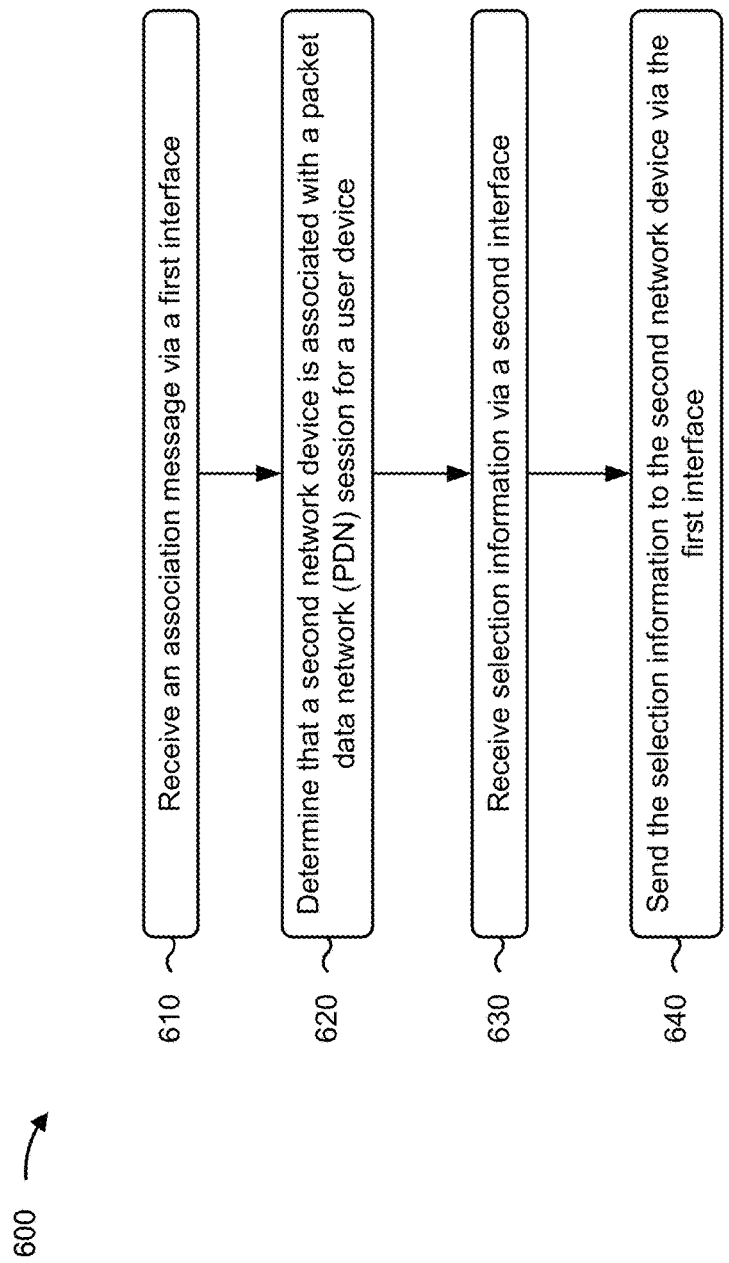

FIG. 6 is a flowchart of an example process 600 associated with systems and methods for facilitating connection to a data network in an interworking core network. In some implementations, one or more process blocks of FIG. 6 may be performed by a first network device of a core network, such as a first network device that is associated with a session management function and a packet data gateway control plane function of a core network (e.g., SMF+PGW-C 108, SMF+PGW-C 208, SMF+PGW-C 330, and/or the like). The core network may be an interworking core network (e.g., that is associated with an EPC network and/or a 5G core network). In some implementations, one or more process blocks of FIG. 6 may be performed by another device or a group of devices separate from or including the first network device, such as any other device described in relation to FIGS. 1A-1F, 2A-2B, and 3. Additionally, or alternatively, one or more process blocks of FIG. 6 may be performed by one or more components of device 400, such as processor 420, memory 430, storage component 440, input component 450, output component 460, and/or communication component 470.

As shown in FIG. 6, process 600 may include receiving an association message via a first interface (block 610). For example, the first network device may receive, via a first interface and from a second network device that is associated with a serving gateway control plane function of the core network, an association message, as described above. The first interface may be an N16a interface.

As further shown in FIG. 6, process 600 may include determining that a second network device is associated with a PDN session for a user device (block 620). For example, the first network device may determine that the second network device is associated with a PDN session for a user device, as described above.

As further shown in FIG. 6, process 600 may include receiving selection information via a second interface (block 630). For example, the first network device may receive, via a second interface, selection information from a third network device associated with a user plane function of the core network, as described above. The second interface may be an N4 interface. In some implementations, the selection information may include identification information associated with one or more data networks and/or one or more selection rules associated with the one or more data networks.

As further shown in FIG. 6, process 600 may include sending the selection information to the second network device via the first interface (block 640). For example, the first network device may send, via the first interface and based on the association message and determining that the second network device is associated with the PDN session, the selection information to the second network device, as described above. This may cause the second network device to select a fourth network device that is associated with a serving gateway user plane function of the core network to route traffic for the PDN session.

In some implementations, process 600 includes receiving, after sending the selection information to the second network device via the first interface, additional selection information from the third network device via the second interface, and sending the additional selection information to the second network device via the first interface to cause the second network device to select a fifth network device that is associated with a serving gateway user plane function of the core network to route the traffic for the PDN session.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A first network device, comprising:
one or more processors configured to:
identify a first interface between the first network device and a second network device, which is associated with a session management function and a packet data gateway control plane function of a core network;
send an association message to the second network device via the first interface;
receive, from the second network device via the first interface, selection information;
send, via a second interface between the first network device and the second network device, a request related to creation of a packet data network (PDN) session for a user device to the second network device;
receive, from the second network device via the second interface, a response related to the creation of the PDN session;
select, based on the response and the selection information, a third network device associated with a serving gateway user plane function of the core network; and
send an additional association message to the third network device via a third interface between the first network device and the third network device to cause:
the third network device to be associated with a data network; and
the third network device to route traffic for the PDN session between the user device and the data network.

2. The first network device of claim 1, wherein the first interface is an N16a interface and the second interface is an S5-C interface.

3. The first network device of claim 1, wherein the core network is associated with an evolved packet core network and a 5G core network.

4. The first network device of claim 1, wherein the selection information includes one or more selection rules associated with one or more data networks.

5. The first network device of claim 1, wherein the one or more processors, when selecting the third network device, are configured to:
determine locations of one or more network devices respectively associated with serving gateway user plane functions of the core network;
determine, based on the request, a location of the user device;
determine, based on the response, a location of the data network;
identify a particular network device, of the one or more network devices, based on the locations of the one or more network devices, the location of the user device, and the location of the data network; and
select the particular network device as the third network device.

6. The first network device of claim 1, wherein the third interface is an SXa interface.

7. The first network device of claim 1, wherein the one or more processors are further configured to:
receive, via the first interface, additional selection information from the second network device;
select, based on the additional selection information, a fourth network device associated with a serving gateway user plane function of the core network to route the traffic for the PDN session; and
cause the fourth network device to route the traffic for the PDN session.

8. A method, comprising:
sending, by a first network device of a core network, via a first interface, an association message to a second network device that is associated with a session management function and a packet data gateway control plane function of the core network;
receiving, via the first interface, selection information from the second network device;
selecting, by the first network device and based on the selection information, a third network device associated with a serving gateway user plane function of the core network; and
sending, by the first network device, an additional association message to the third network device via a third interface between the first network device and the third network device to cause the third network device to route traffic for a packet data network (PDN) session between a user device and a data network.

9. The method of claim 8, wherein the first interface includes an N16a interface.

10. The method of claim 8, wherein the core network is an interworking core network.

11. The method of claim 8, wherein the selection information includes identification information associated with one or more data networks and one or more selection rules associated with the one or more data networks.

12. The method of claim 8, wherein selecting the third network device of the core network to route the traffic for the PDN session comprises:
identifying one or more network devices respectively associated with serving gateway user plane functions of the core network;
determining, by the first network device and based on the selection information, identification information associated with one or more data networks and one or more selection rules associated with the one or more data networks;
identifying, by the first network device, a particular network device, of the one or more network devices, based on the identification information associated with one or more data networks and the one or more selection rules associated with the one or more data networks; and
selecting the particular network device as the third network device.

13. The method of claim 8, wherein the third interface includes an SXa interface.

14. The method of claim 8, further comprising:
receiving, via the first interface, additional selection information from the second network device;
selecting, based on the additional selection information, a fourth network device associated with a serving gateway user plane function of the core network; and
causing the fourth network device to route the traffic for the PDN session.

15. A non-transitory computer-readable medium storing a set of instructions, the set of instructions comprising:
one or more instructions that, when executed by one or more processors of a first network device that is associated with a session management function and a packet data gateway control plane function of a core network, cause the first network device to:
receive, via a first interface, an association message from a second network device that is associated with a serving gateway control plane function of the core network;
determine that the second network device is associated with a packet data network (PDN) session for a user device;
receive, via a second interface, selection information from a third network device associated with a user plane function of the core network; and
send, via the first interface and based on the association message and determining that the second network device is associated with the PDN session, the selection information to the second network device to cause the second network device to:

select a fourth network device that is associated with a serving gateway user plane function of the core network to route traffic for the PDN session; and send an additional association message to the fourth network device via a third interface between the second network device and the fourth network device to cause the fourth network device to route traffic for the PDN session between the user device and a data network.

16. The non-transitory computer-readable medium of claim 15, wherein the first interface is an N16a interface and the second interface is an N4 interface.

17. The non-transitory computer-readable medium of claim 15, wherein the selection information includes identification information associated with one or more data networks and one or more selection rules associated with the one or more data networks.

18. The non-transitory computer-readable medium of claim 15, wherein the one or more instructions further cause the first network device to:

receive, after sending the selection information to the second network device via the first interface, additional selection information from the third network device via the second interface; and send, via the first interface, the additional selection information to the second network device to cause the second network device to select a fifth network device that is associated with a serving gateway user plane function of the core network to route the traffic for the PDN session.

19. The non-transitory computer-readable medium of claim 15, wherein the selection information includes one or more selection rules associated with one or more data networks.

20. The non-transitory computer-readable medium of claim 15, wherein the third interface is an SXa interface.

\* \* \* \* \*